United States Patent [19]

Briles

[11] 4,159,666
[45] * Jul. 3, 1979

[54] EXPANDING HEAD RIVETING METHOD AND SYSTEM

[76] Inventor: Franklin S. Briles, 1301 Dolphin, Corona del Mar, Calif. 92625

[*] Notice: The portion of the term of this patent subsequent to May 2, 1995, has been disclaimed.

[21] Appl. No.: 791,715

[22] Filed: Apr. 28, 1977

Related U.S. Application Data

[60] Division of Ser. No. 732,869, Oct. 15, 1976, Pat. No. 4,051,592, which is a continuation-in-part of Ser. No. 645,242, Dec. 29, 1975, Pat. No. 4,000,680.

[51] Int. Cl.² .......................................... F16B 19/04
[52] U.S. Cl. ............................................... 85/37
[58] Field of Search .................. 85/37, 9 R; 29/509, 29/522, 526; 403/408

[56] References Cited

U.S. PATENT DOCUMENTS

| | | | |
|---|---|---|---|
| 2,233,820 | 3/1941 | Pavlecka | 85/37 X |
| 2,237,338 | 4/1941 | Dale | 85/37 |
| 2,482,391 | 9/1949 | Webster | 85/37 |
| 2,991,858 | 7/1961 | Taylor et al. | 85/37 X |
| 3,747,467 | 7/1973 | Rosman | 85/37 |
| 3,748,948 | 7/1973 | Schmitt | 85/37 X |
| 3,936,205 | 2/1976 | Speakman | 85/37 X |
| 4,016,703 | 4/1977 | Champoux et al. | 75/9 R X |
| 4,086,839 | 5/1978 | Briles | 85/37 |

FOREIGN PATENT DOCUMENTS 707103  6/1941  Fed. Rep. of Germany .............. 85/37

Primary Examiner—Thomas J. Holke
Attorney, Agent, or Firm—William W. Haefliger

[57] ABSTRACT

In combination with a workpiece having a bore, a first counterbore, and a second counterbore which is frusto-conical and tapers forwardly between the first counterbore and the bore and toward the bore, (a) a rivet having an axially extending shank received in the workbore and defining an axis, (b) the rivet including a head having an end face, a first section located forwardly of said end face, and a second and forwardly tapered frusto-conical section located forwardly of the first section, (c) the first section having an initial undeformed outer surface of a diameter which is less than but about the same as the initial diameter of the first counterbore, the rivet first section being radially deformed to have peripheral engagement with the first counterbore, (d) said head end face being substantially flush with the work surface.

11 Claims, 20 Drawing Figures

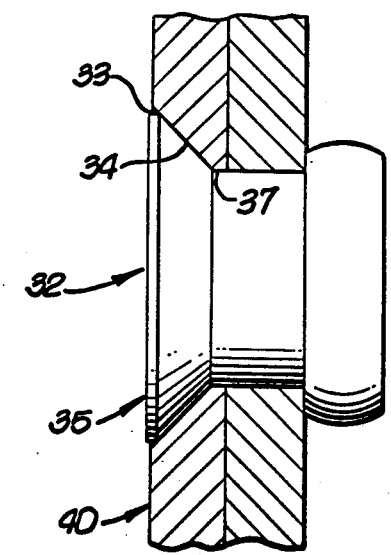
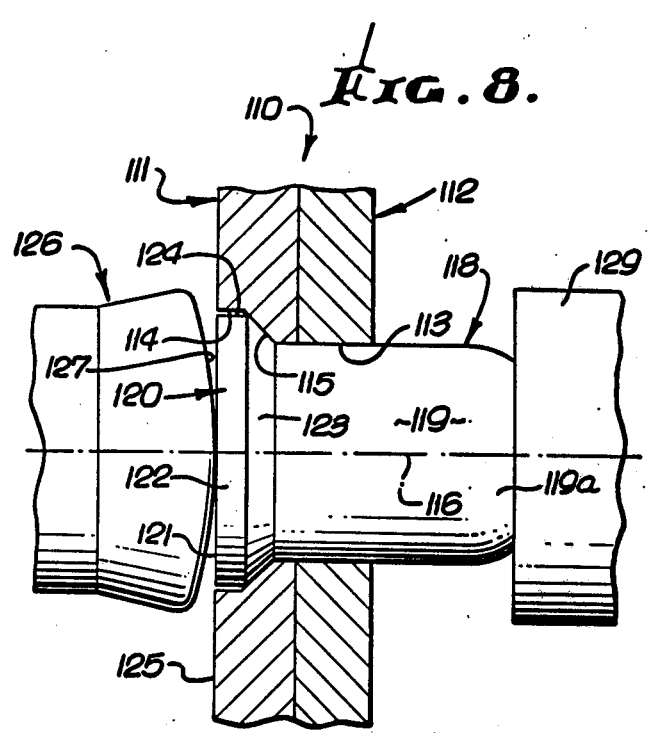
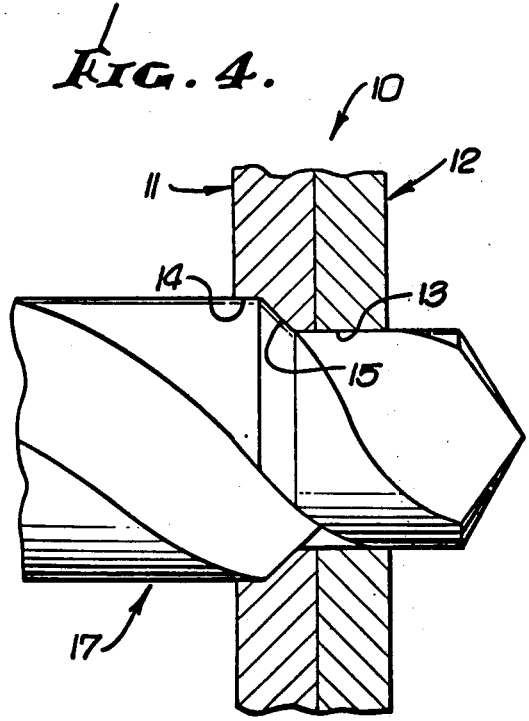
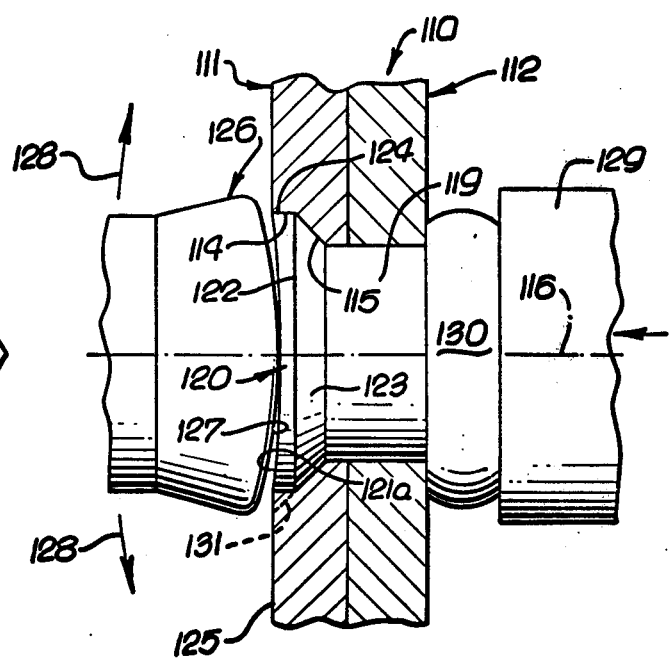

EXPANDING HEAD RIVETING METHOD AND SYSTEM

BACKGROUND OF THE INVENTION

This is a division, of application Ser. No. 732,869, filed Oct. 15, 1976, now U.S. Pat. No. 4,051,592, which application is a continuation-in-part of my co-pending application Ser. No. 645,242, filed Dec. 29, 1975, now U.S. Pat. No. 4,000,680.

This invention relates generally to fasteners, and more particularly concerns improvements in rivet type fasteners having certain unusual advantages in construction, more of installation and operation.

Experience with conventional rivet retention of aircraft skins to fuselage structures has indicated several disadvantages and problems, particularly where fully tapered rivet heads are employed. It has been found that when the structure including the skin or panel is flexed, the fully tapered hole (countersunk in the skin to receive the head) tends to elongate, i.e., become non-circular, producing a clearance between the rivet head and the tapered seat. As a result, corrosive fluids can and do enter this gap or clearance to corrode the connection over a period of time. Also, "fretting" of the skin material at the countersink frequently occurs as the rivet head rocks in the countersink, weakening the skin material so that fatigue cracks can and do occur more readily. Paint or other sealant applied over the rivet head and skin surface as a barrier tends to crack in response to flexing and to become ineffective to prevent ingress of corrosive fluid. Also, the paint enters the circular clearance about the rivet head end to form an unsightly, visible ring. Another problem concerns the relatively large outer diameters of fully tapered conventional rivet heads, which undesirably limits the number of rivets that can be employed in or along a given area or dimension of skin material. A further problem has to do with the difficulty of maintaining a flush relationship of the rivet head and the work surface.

SUMMARY OF THE INVENTION

It is a major object of the invention to provide solutions to the above as well as other problems, through the provision of a simple rivet and riveted connection incorporating a number of unusual advantages. Basically, these stem from the concept that the rivet head is made to fit the hole is unusually advantageous manner, rather than the hole being formed to fit the rivet head as in the past. Another major object is to reduce the size of the rivet head, as for example to about 1.4 times the diameter of the shank, in order to provide higher pounds per square inch concentration in the head, thereby to obtain back-filling of rivet metal under the head in response to upset formation, and also to obtain uniform expansion of the rivet shank in the hole.

Typically, the workpiece or skin has a main bore, a first counterbore which advantageously is or may be substantially cylindrical, and a second counterbore which is frusto-conical to taper forwardly between the first counterbore and the main hole. The rivet itself has an axially extending shank received in the workbore and defines an axis, a head having an end face, a first radially expandable sealing section immediately forwardly of the end face, and a second and forwardly tapered seating section located between the first section and the shank. As will be seen, the first section has an initial undeformed outer surface of a diameter which is less than but about the same as the initial diameter of the workpiece first counterbore; further, the rivet first section is radially outwardly deformed in place to have peripheral engagement with the first counterbore to establish a seal therebetween, while the head is confined in the hole (i.e., the counterbores). Also, the first counterbore is preferably radially deformed outwardly by the radial expansion of the rivet head first section, and to an extent that the first counterbore remains circular in use, i.e., does not elongate relative to the head circular first section, in response to flexing, whereby corrosive fluids cannot enter between the head and work. For best results, and considering the use of dissimilar materials, the radially outward deformation of the first counterbore is between 0.0005 and 0.012 inches, in the assembled condition.

Further, full reception of the head into the work counterbore, with slight clearance prior to deformation, as described, enables ready and full initial insertion of the rivet into the work as well as relatively easy maintenance of flushness as between the head end face and the work during rivet deformation, the end face typically becoming slightly concave, as will appear; the work first counterbore and the outer surface of the rivet head first section are of approximate equal length and are substantially cylindrical although they may taper slightly forwardly as will appear; also, the rivet preferably consists of a metal which is softer than the work; however, in certain instances, the rivet material may be harder than the work. In addition, the rivet may be axially impacted at either end, and bucked at the opposite end (or squeezed endwise) to expand the head and form the upset in the manner to be described. The fastener is thereby made fluid tight. As will appear, the invention is especially advantageous when employed on thin skins, as in aircraft panels. Also, shaving of the rivet head is made unnecessary and appearance is improved.

Additional objects include providing the rivet head with a ring-shaped dome located to assist desired radial expansion of the head and to prevent formation of a gap adjacent the second counterbore, when the dome is flattened or deformed, as will be seen, and the provision of a riveting method employing a ring-domed rivet, as described, and with or without a tapered shank.

These and other objects and advantages of the invention, as well as the details of an illustrative embodiment, will be more fully described in the following specification relating to the drawings in which:

DRAWING DESCRIPTION

FIG. 3 is an elevation, taken in section, showing a conventional rivet after completion of deformation; and FIG. 4 is an elevation, taken in section, showing a tool initially forming the bore, counterbore and countersink in the workpiece;

FIGS. 8 and 9 are elevations similar to FIGS. 1 and 2, respectively;

DETAILED DESCRIPTION

Figure 1:
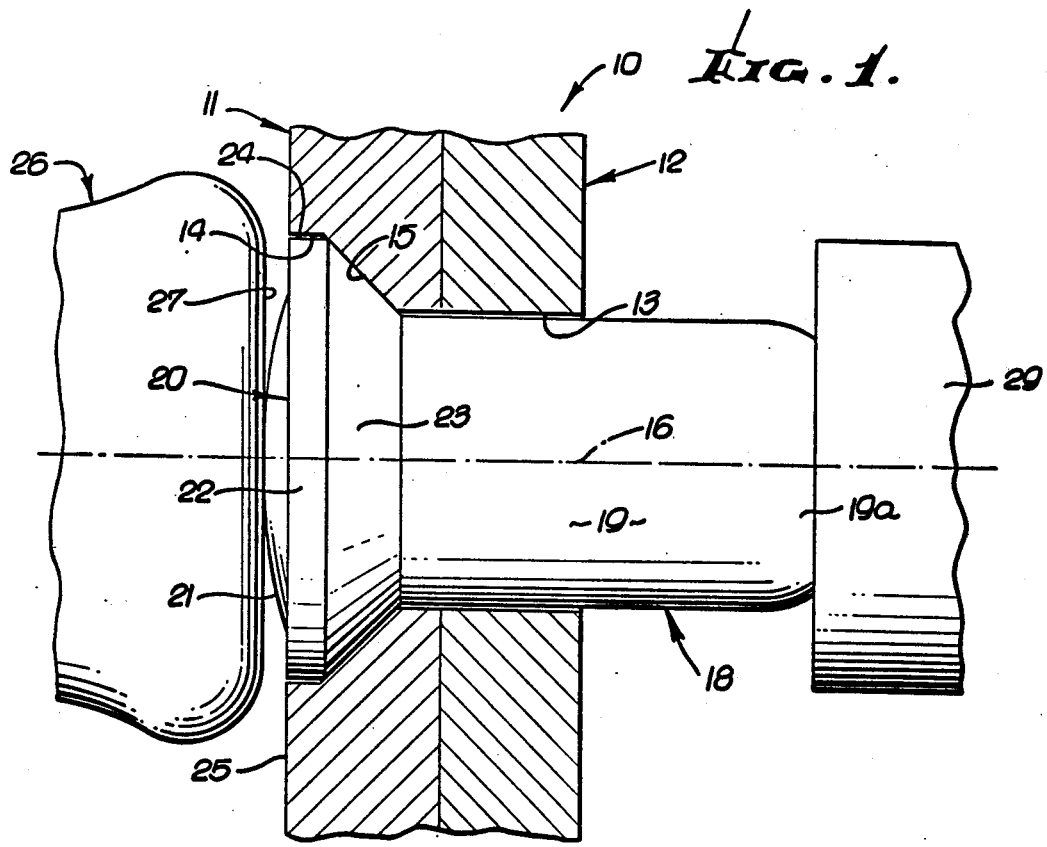
FIG. 1 is an elevation, taken in section, showing a rivet inserted into a workpiece, and just prior to rivet deformation.
Figure 2:
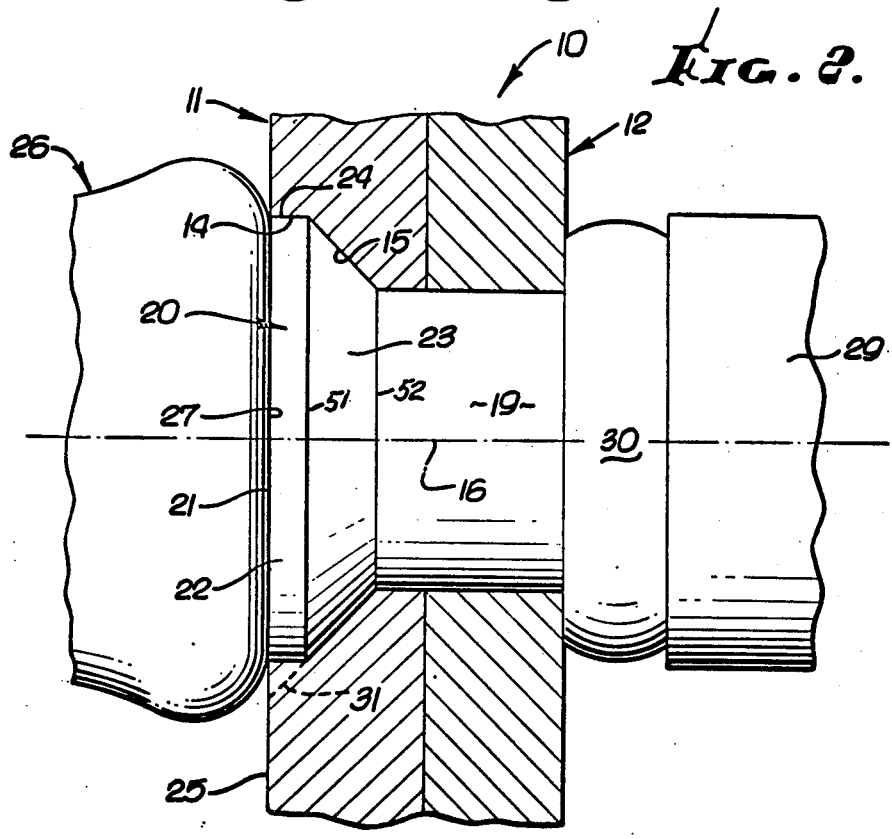
FIG. 2 is a view like FIG. 1 but immediately following rivet deformation.

In FIGS. 1 and 2, the workpiece 10 includes, for example, two metallic panels 11 and 12. The latter contain a main bore 13 extending in both panels, a first substantially cylindrical counterbore 14 and a second frusto-conical counterbore 15 in panel 11. The second counterbore 15 forms a countersink, as shown, extending between counterbore 14 and bore 13; also the bore 13, and counterbores 14 and 15 have a common forwardly extending axis 16. FIG. 4 shows a rotary combination drill 17 forming the bore and counterbore.

FIG. 1 also shows a metallic (or equivalent non-metallic material) rivet 18 having an axially extending cylindrical shank 19 received or inserted forwardly in and through bore 13, with clearance as indicated, the rivet tail end 19a projecting forwardly of panel 12.

The rivet also includes a reduced diameter head 20 having a rearward end face 21 which may be initially domed as seen in FIG. 1, a first section 22 located forwardly of end face 21, and a second and forwardly tapered frusto-conical section 23 located forwardly of the first section. The first section has, in FIG. 1, an initially undeformed outer surface 24 diameter which is slightly less (up to about 0.010 inches less, radially) than the initial diameter of the first counterbore 14; however, as shown in FIG. 2, the rivet section 22 is radially deformed or expanded outwardly into tight peripheral engagement with the first counterbore 14, thereby providing such a tight seal therewith as to prevent ingress of corrosive fluid from the exterior during normal flexing of the work. In this regard, the counterbore 14 is preferably expanded radially outwardly by the rivet first section periphery, in assembled condition, and between 0.0005 and 0.012 inches, for best results. Further, the rivet metal is preferably softer than the work metal; for example, the rivet may have a tensile strength of at least about 14,000 psi and higher, and the work a tensile strength substantially in excess of the rivet tensile strength, for best results. The rivet and work may consist of like or unlike materials such as aluminum, aluminum alloy, Monel, titanium or titanium alloy, for example. Thus, the head and work will expand and contract at the same rate to prevent formation of radial gaps during temperature change. In certain instances, the rivet may be harder than the work.

Also, both the counterbore 14 and the rivet first section outer surface 24 preferably are substantially cylindrical, but may have frusto-conical taper angularity between 0° and 10° relative to axis 16. The shank diameter is typically about the same as the total thickness of panels 11 and 12, and such thickness is typically between 0.032 and 3.0 inches. In FIG. 2 the axial length of the land 22 between the head end face and intersection 51 is typically between about 0.008" to 0.140". In FIG. 1, the volume of the dome is such that when the head is deformed to be substantially flush with the work, the first section is expanded to tightly engage counterbore 14, as described above. Also, the dome protrudes sufficiently, in FIG. 1, that the driver 26 does not deleteriously strike the work surface during deformation of the rivet.

It will be noted from FIG. 2 that the head end face 21 is substantially flush with the work face 25; also, the end face 21 is made substantially flat, rearwardly, as a result of impact engagement of "roll" type hammer or driver 26, the latter having a forwardly flat surface 27. An anvil 29 is urged against the tail 19a to form the upset 30 (seen in FIG. 2) during impacting or squeezing of the head. Work countersink 15 shoulders the rivet tapered section 23, during impacting, to stop forward travel of the rivet in the work. Rivet metal tends to back fill (i.e., become displaced rearwardly and into the countersink area 15) in response to formation of the upset. The shank 19 also undergoes normal radial expansion to uniformly expand the bore 13 up to about 0.010 inches, radially.

The method of securing the rivet in FIG. 2 position may be considered to include the following steps:

(a) seating the rivet head against the work second counterbore while maintaining only slight annular clearance between the work first counterbore and the rivet head, (b) expanding the rivet head radially outwardly to tightly engage the work first counterbore, and (c) maintaining the head confined within the first and second counterbores during said radial expansion.

Further, back and forth oscillation of the rivet in the work is reduced or eliminated, since the rivet head becomes frictionally locked to the work at the first counterbore prior to completion of formation of the upset 30.

Further, impact delivery may be carried out to deliver one or more impacts to the same or different portions of the head end face (as by rocking the hammer) while the head remains confined within the counterbores; impact delivery may be continued until the first counterbore 14 is radially outwardly deformed in assembled condition, with radial compression of the head, and peripheral tension of the work at the counterbore, thereby to form a peripheral seal which will not be broken during normal flexing of the work; and the head end of the rivet may be maintained substantially flush with the work side 25 as the seal is formed. Paint subsequently applied over the flattened end face 21 and workside 25 tends not to form a visible ring, or crack during flexing of the work, high fatigue strength of the work will be achieved, and high shear strength of the rivet head will be maintained.

In addition, the rivets may be placed more closely together, since excess tapered hole extent indicated by broken line 31 in FIG. 2 is eliminated reducing hole size. FIG. 3 shows a prior art rivet 32 with a fully tapered head 35 forming a peripheral corrosion gap 33 at the edge of the hole 34. When paint is applied, it enters the gap and forms an objectionable visible ring; also it cracks when flexed, and allows corrosive fluid to enter the gap.

The invention enables easier flush riveting using "roll" hammer 26, with assurance of a positive seal at the head and work interface; less rolling and rocking of the head is necessary, during riveting; the rivet is easy to drill out if required; warpage of the work due to riveting is reduced; and the formation of the seal between the work and rivet head eliminates openings therebetween during flexing of the work, so that ingress of corrosive fluid is prevented. All of these advantages are typically obtained at essentially no increase in cost over standard rivets.

Figure 5A:
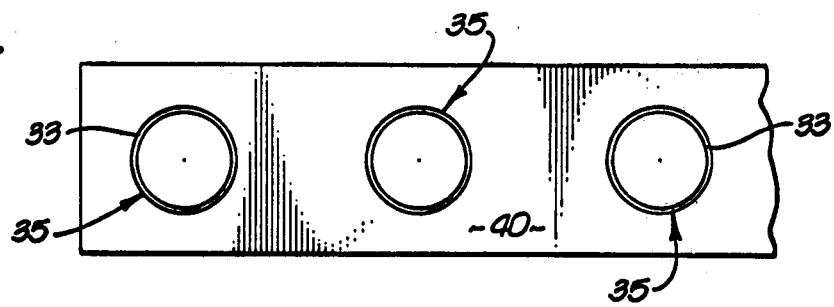
FIGS. 5a and 5b are plan views showing different rivet head sizes.
Figure 5B:
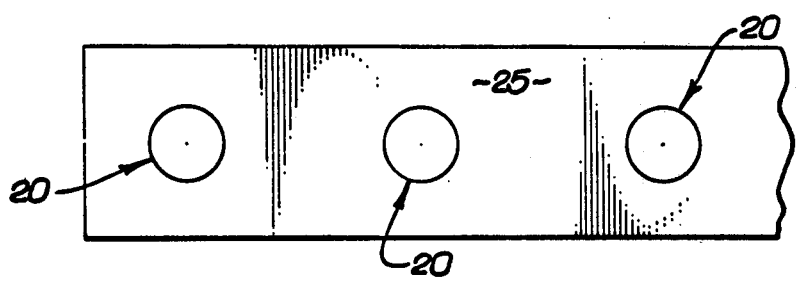

FIG. 5a shows larger conventional rivet heads 35 occupying more area at the surface at work 40 than is desired; whereas FIG. 5b shows smaller rivet heads 20 of the present invention desirably occupying less space in work 25.

Figure 6A:
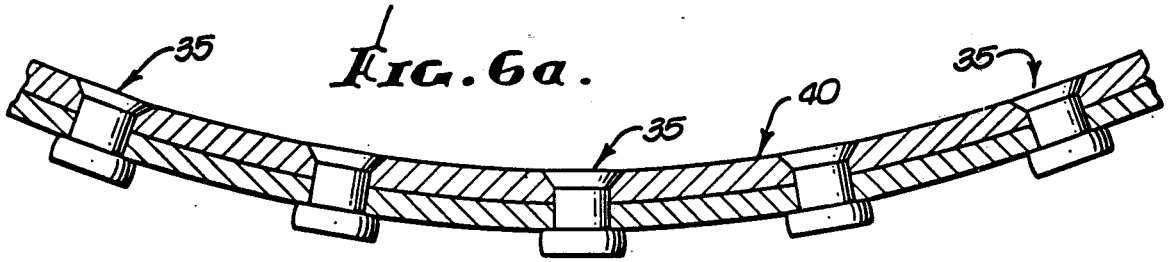
FIGS. 6a and 6b are sections showing differences in work warpage produced by different rivets.
Figure 6B:
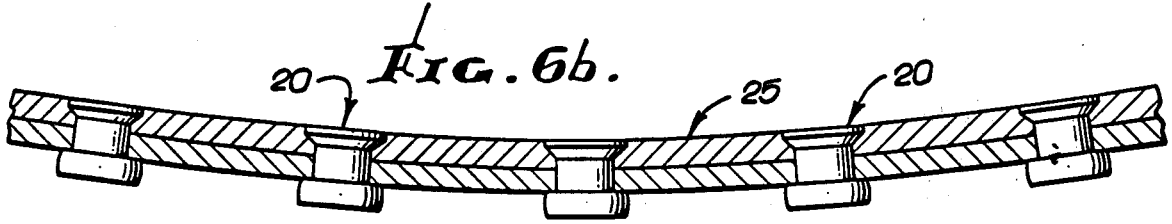

FIG. 6a shows relatively greater warpage (somewhat exaggerated) produced in work panels by a row of conventional rivets 35; whereas, FIG. 6b illustrates relatively less warpage produced in work panels by a row of rivets 20 of the present invention. Such warpage reduction is very important, as in work panels used by small aircraft.

Figure 7A:
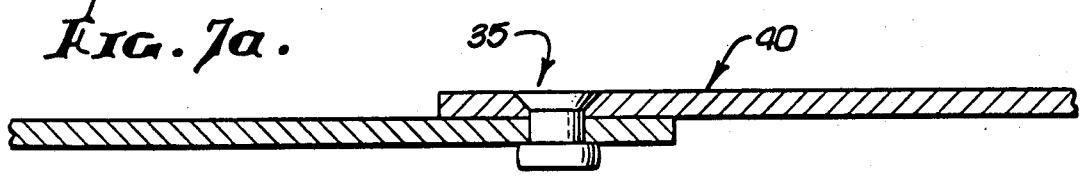
FIGS. 7a and 7b are sections showing shear relationships of different rivets.
Figure 7B:
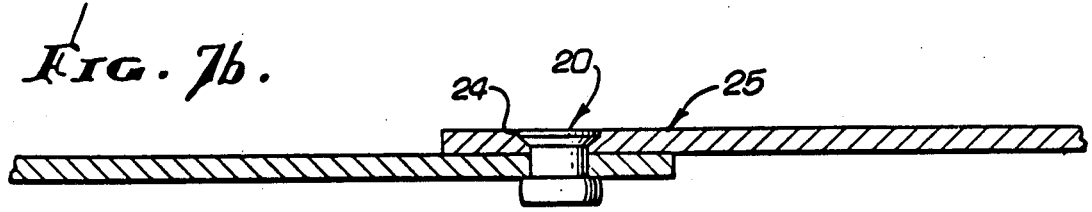

FIGS. 7a and 7b indicate that greater shear strength is obtained by use of rivets 20 than is obtainable by conventional rivets 35, the head shear or bearing area surface 24 providing this margin of strength increase. The load bearing area is thereby increased; and, as the sheet thickness decreases, the bearing area at 24 remains and becomes more significant, whereas in prior rivets the bearing area at the shank (at 37 in FIG. 3) decreases and may be eliminated if the sheet thickness is sufficiently reduced.

FIGS. 8 and 9 correspond to FIGS. 1 and 2, but illustrate the application of the invention to initially flat rivet head 120. The latter includes a leftwardly flat end face 121 just prior to rivet deformation. During such deformation, as seen in FIG. 9, the flat face is dished or made concave at 121a while remaining substantially flush with the work face 125. The remaining elements shown in FIGS. 8 and 9 correspond to those shown in FIGS. 1 and 2, having the same numbers except for the use of a one-hundred pre-fixed digit in FIGS. 8 and 9. Note further that the forward end face 127 of the driver 126 is convex toward face 121. The driver 126 is typically rolled laterally, as indicated by arrows 128, and in different directions during deformation of the rivet head, to produce the concavity at 121a.

Figure 10:
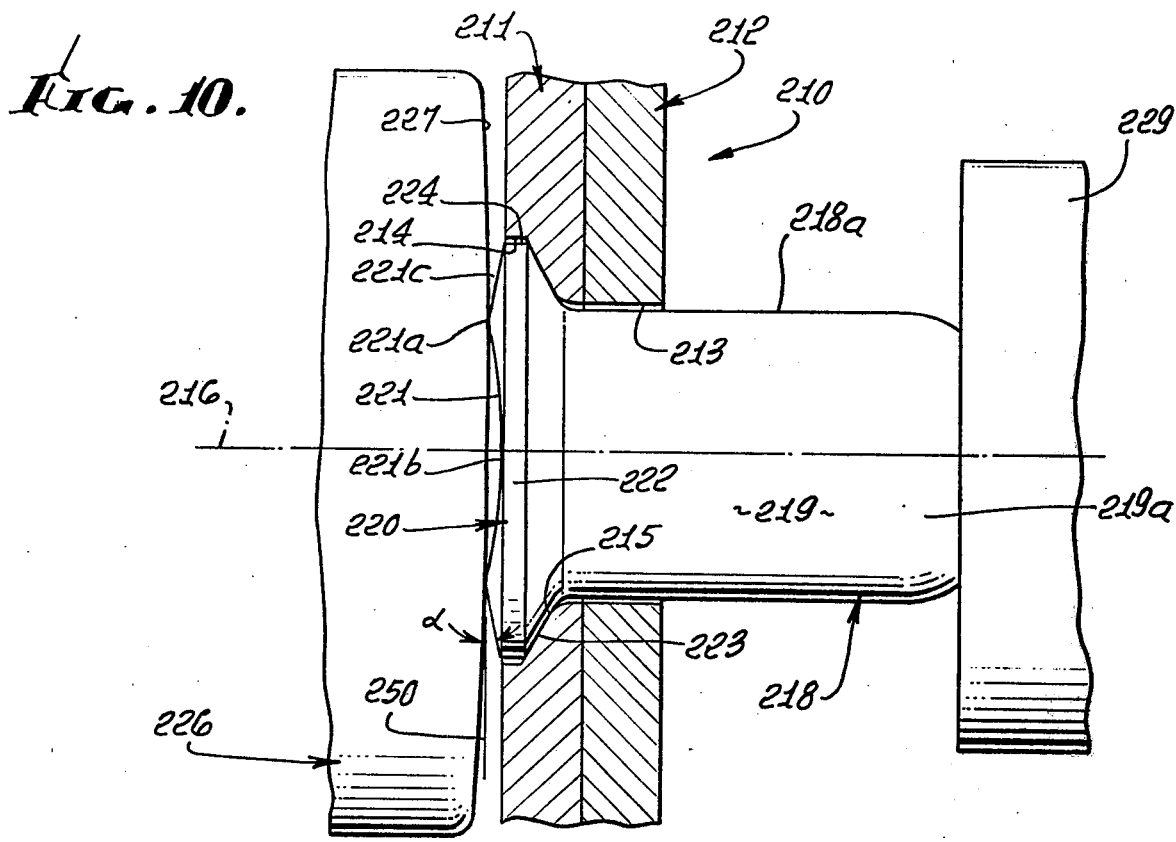
FIG. 10 is a view like FIG. 1 showing a modified rivet having a ring domed end face.
Figure 11:
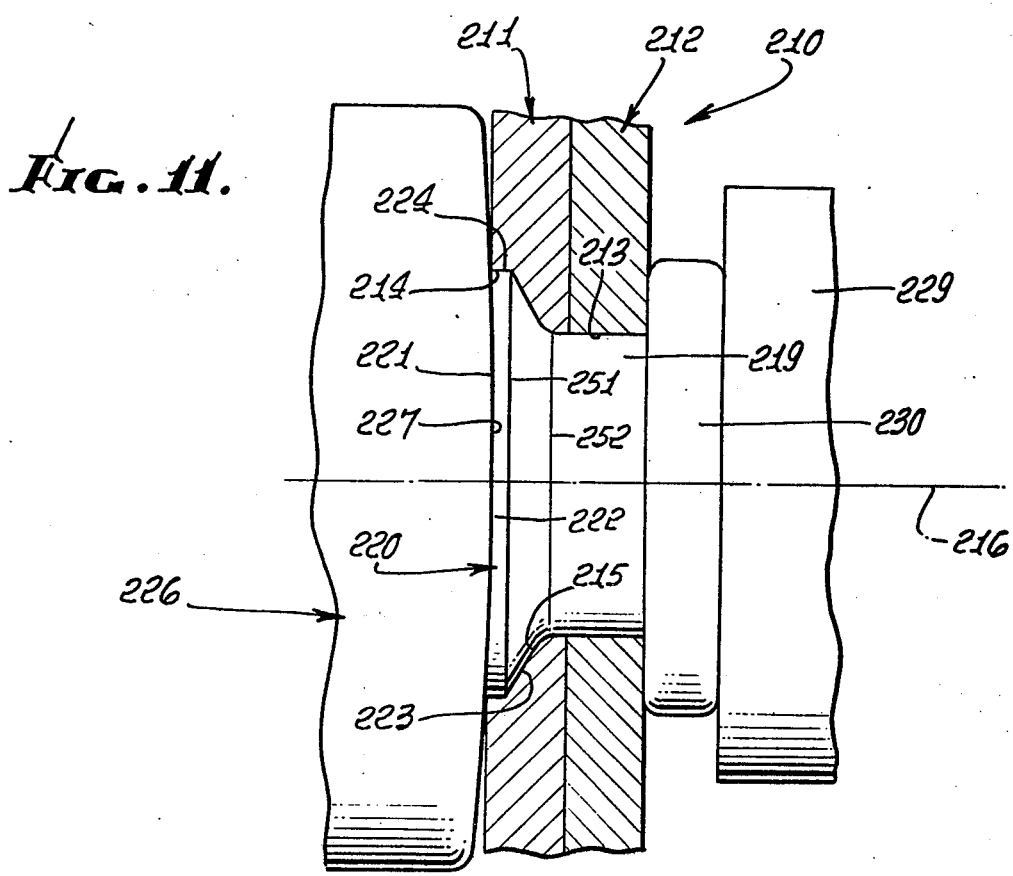
FIG. 11 is a view like FIG. 2 showing the FIG. 10 rivet after flattening of the ring-dome.

FIGS. 10 and 11 correspond to FIGS. 1 and 2, but illustrate the use of a rivet head 220 having an end face 221 forming a rearwardly bulging ring-dome at 221a prior to deformation. The ring dome generally, and the crest thereof in particular, is in substantial axial alignment with the shank periphery 218a. The central portion of the end face 221 is dished at 221b; and the radially outermost annular surface 221c of the dome 221a flares forwardly toward the first counterbore in the workpiece 211 at an angle α from a plane 250 normal to axis 216. Angle α is between 2° and 25°.

In this regard, the use of the ring-dome assures that no gap will be produced between the rivet forwardly tapered section 223 and the work second counterbore 215 on deformation and radial expansion of the rivet head, as described above in connection with FIGS. 1–9. During such deformation, as seen in FIG. 11, the end face 221 is flattened, and made flat to slightly concave by convex surfaced hammer or driver 226, and the ring-dome is substantially eliminated. The remaining elements shown in FIGS. 10 and 11 correspond to those identified in FIGS. 1 and 2 having the same numbers except for the use of a two-hundred pre-fix digit in FIGS. 10 and 11.

Figure 12:
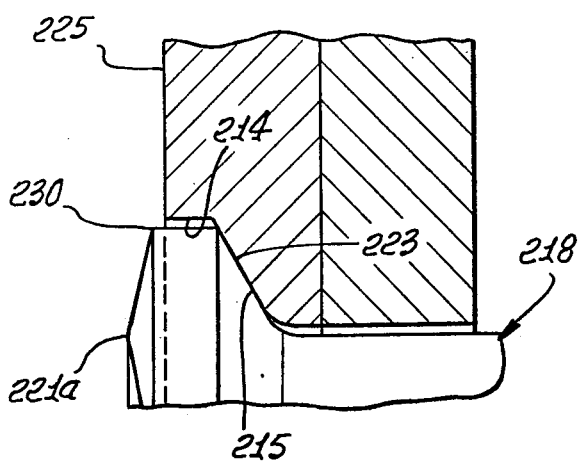
FIGS. 12 and 13 are fragmentary views showing modifications.
Figure 13:
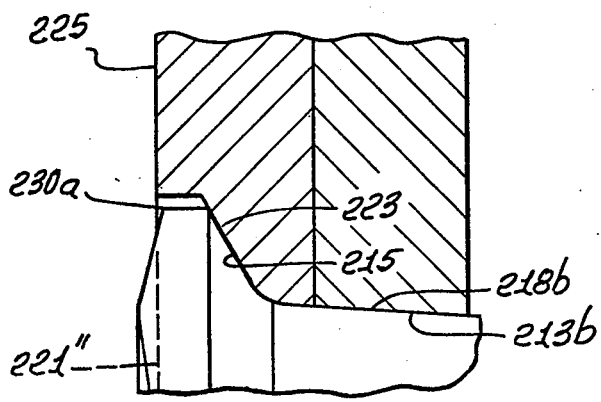

FIG. 12 shows a rivet essentially the same as in FIG. 10, and bearing the same identifying numerals; however, the head thickness is shown slightly greater than in FIG. 10, so that edge 230 initially protrudes from counterbore 214 when the rivet section 223 initially seats at work counterbore 215. After head deformation and elimination of the ring dome 221a, the head flattened end surface is substantially flush with but extends slightly outwardly from surface 225. The opposite condition is shown in FIG. 13, with the head thickness slightly less than in FIG. 10, so that edge 230a is received a few thousands of an inch into the work counterbore recess when the rivets section 223 initially seats at work counterbore 215. After head deformation, the head end surface appears as at 221'', the head surface 221'' being substantially flush with work surface 225. Accordingly, the amount of material in the ring dome is such that, when flattened, and with the head radially expanded, the end face will be substantially flush with the work surface. For example the extent of the rearward bulge of the ring dome crest from edge 230a is less than about 0.020 inch. Note that shank 218b is forwardly tapered to fit forwardly tapered bore 213b, in FIG. 13. A tapered bore and counterbore can be drilled to closer tolerances than a straight bore and counterbore, to enable use of harder materials.

Figure 14:
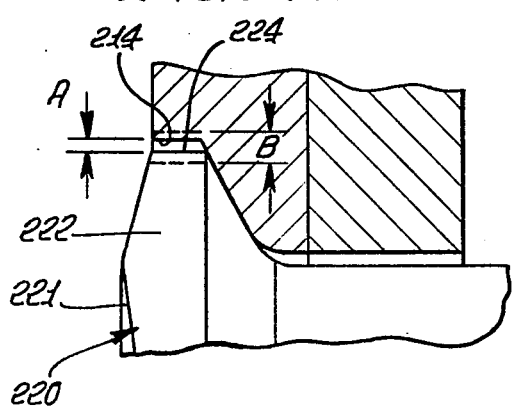
FIG. 14 is a fragmentary view showing dimensional relationships as between a rivet head and work counterbore.

FIG. 14 corresponds to FIG. 10, and illustrates certain dimensional relationships as respects the initial radial gap between the head first section cylindrical peripheral surface 224, and the work first cylindrical counterbore 214. The minimum gap upon assembly is designated at A, and the maximum gap at B (with the head first section having a reduced diameter and the counterbore having an enlarged diameter). For workability, A should equal 0.0001 inch minimum for reception in the hole, and B should equal up to about 3% of the head overall diameter; also, B is always greater than A.

Figure 15:
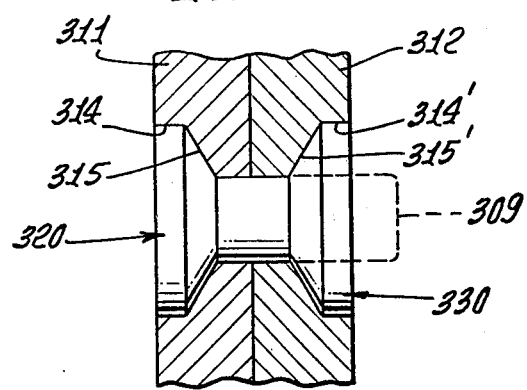
FIGS. 15 to 17 are sections showing modified rivet connections.

Referring to FIG. 15, the riveted connection includes a rivet head 320 after its deformation and expansion into counterbore 314 and 315. The head may have the construction of any of heads 20, 120 and 220 previously described, and the counterbores 314 and 315 may have the construction of any of the previously described counterbores 14 and 15, 114 and 115, and 214 and 215. The work panels appear at 311 and 312, and panel 312 may be formed with counterbores 314' and 315' corresponding to counterbore 314 and 315. The rivet shank, originally appearing as shown by broken line 309, is deformed by an anvil corresponding to anvil 29, to form an upset 330 filling counterbores 314' and 315' expanding counterbore 314' in the same manner as counterbore 314 is expanded (i.e., as counterbore 14 is expanded in FIG. 2).

Figure 16:
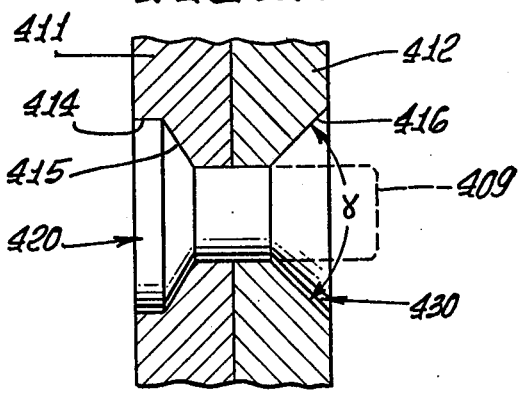

In FIG. 16, the riveted connection includes a rivet head 420 after its deformation and expansion into counterbores 414 and 415. As in FIG. 15, the head may have the construction of any of heads 20, 120 and 220, and the counterbores 414 and 415 may have the construction of any of the counterbores 14 and 15, 114 and 115, and 214 and 215. The work panels appear at 411 and 412, and panel 412 may be formed with counterbore 416 tapered as shown (angle γ may be 100°, for example). The rivet shank originally appearing as shown by broken line 409, is deformed by an anvil corresponding to anvil 29, and forms an upset filling the tapered counterbore 416. The upset appears at 430.

Button upset rivets were shown in FIGS. 2, 9 and 11, and may have originally domed heads as there described.

Figure 17:
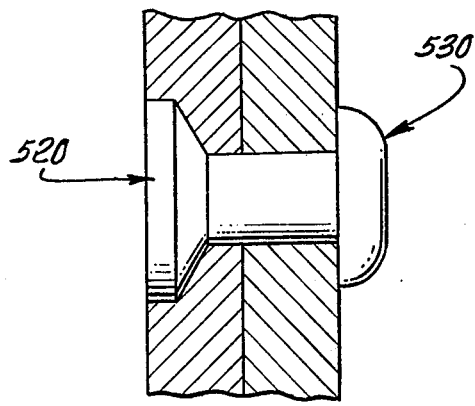

If desired, a straight slug may be used and deformed at both ends to produce the FIG. 15 riveted connection; also, a straight shank rivet with a tapered head as at 430 may be employed and deformed at its opposite (left) end to produce the FIG. 16 connection. A straight shank, originally button-headed rivet as seen in FIG. 17 may be deformed at its left end to produce the FIG. 17 connection. The button-head is shown at 530, and deformed head at 520. Head 520 is like heads 320 and 420.

I claim:

1. In combination with a workpiece having a bore, a first counterbore which is substantially cylindrical, and a second counterbore which is frusto-conical and tapers forwardly between the first counterbore and the bore and toward the bore,
   (a) a rivet having an axially extending shank received in the workpiece and defining an axis,
   (b) the rivet including a head having an end face, a first section located forwardly of said end face, and a second and forwardly tapered frusto-conical section located forwardly of the first section,
   (c) the first section having an initial undeformed outer surface of a diameter which is less than but about the same as the initial diameter of the first counterbore, the rivet first section being radially deformed to have peripheral engagement with the first counterbore,
   (d) said head end face being substantially flush with the work surface,
   (e) said head end face initially defining an undeformed ring-shaped dome extending about said axis and in substantial axial alignment with the outer surface of the shank,
   (f) the dome having an annular crest portion in axial alignment with said shank outer surface, and the dome radially outer extent which defines only about half of the dome being located in axially spaced relation to a forward taper defined by said second and forwardly tapered section, said dome crest portion being rearwardly convex in axial radial planes,
   (g) the head end face forming a concave central recess radially inwardly of said crest portion, the outermost annular extent of said recess located approximately in alignment with the outer surface of the shank.

2. The combination of claim 1 wherein the length of said first section is between about 0.008 inches and 0.140 inches.

3. The combination of claim 1 wherein the radially outermost annular surface of said dome flares toward said first counterbore at an angle of between about 2° and 25° from a plane normal to said axis, when the rivet is fully inserted into the bore and counterbores.

4. The combination of claim 1 wherein the rivet shank and workpiece bore are in interengagement and taper forwardly.

5. The combination of claim 1 wherein the workpiece includes two parallel panels, the counterbores formed in one panel, and the rivet having an upset at the end of the shank opposite said head, said upset engaging the other panel.

6. The combination of claim 5 wherein said other panel contains first and second counterbores similar to those in the one panel, said upset filling said counterbores in the other panel.

7. The combination of claim 5 wherein the other panel contains a single tapered counterbore which is coaxial with the first and second counterbores, said upset filling said single tapered counterbore.

8. The combination of claim 5 wherein the upset comprises a button at the outer side of the other panel.

9. For combination with a workpiece having a bore, a first counterbore which is substantially cylindrical, and a second counterbore which is frusto-conical and tapers forwardly between the first counterbore and the bore,
   (a) a rivet having an axially extending shank receivable in the workbore and defining an axis,
   (b) the rivet including a head having an end face, a first section located forwardly of the end face, and a second and forwardly tapered section located forwardly of the first section,
   (c) the first section having an undeformed outer surface of a diameter which is less than but about the same as the diameter of the first counterbore so that the first section is radially outwardly deformable into tight peripheral engagement with the first counterbore, and
   (d) said head end face defining a ring-shaped dome extending about said axis in substantial axial alignment with the outer surface of said shank,
   (e) the dome having an annular crest portion in axial alignment with said shank outer surface, and the dome radially outer extent which defines only about half of the dome being located in axially spaced relation to a forward taper defined by said second and forwardly tapered section, said dome crest portion being rearwardly convex in axial radial planes,
   (f) the head end face forming a concave central recess radially inwardly of said crest portion, the outermost annular extent of said recess located approximately in alignment with the outer surface of the shank.

10. The rivet of claim 9 wherein the radially outermost annular surface of the dome flares forwardly at an angle of between about 2° and 25° from a plane normal to said axis.

11. The rivet of claim 9 wherein the shank tapers forwardly.

* * * * *